(No Model.) 3 Sheets—Sheet 1.
A. F. GEORGE.
AUTOMATIC BRAKE FOR VEHICLES.
No. 450,100. Patented Apr. 7, 1891.
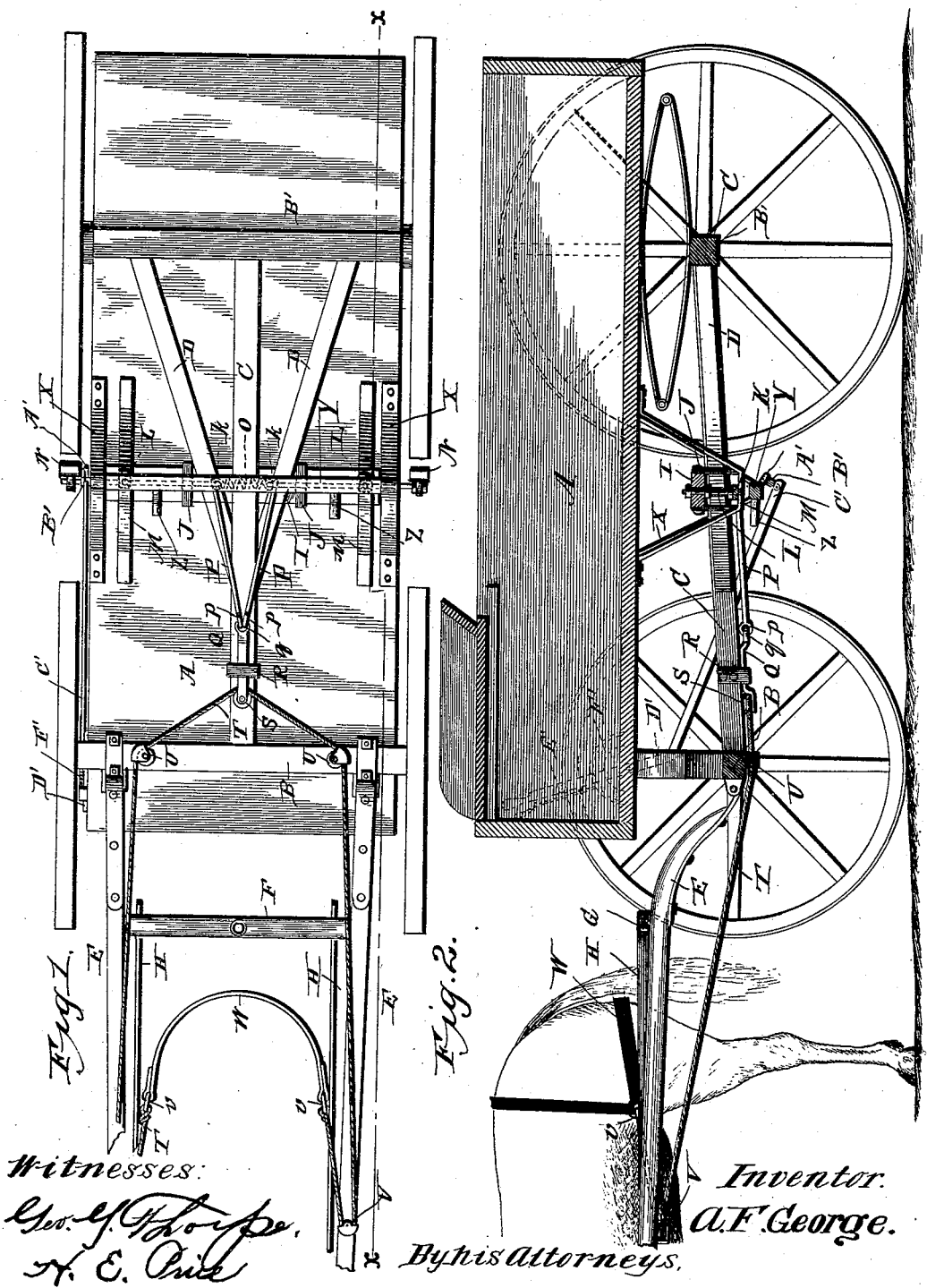
Witnesses:
Geo. Y. Thorpe.
H. E. Price
Inventor:
A. F. George.
By his Attorneys,
Higdon & Higdon.

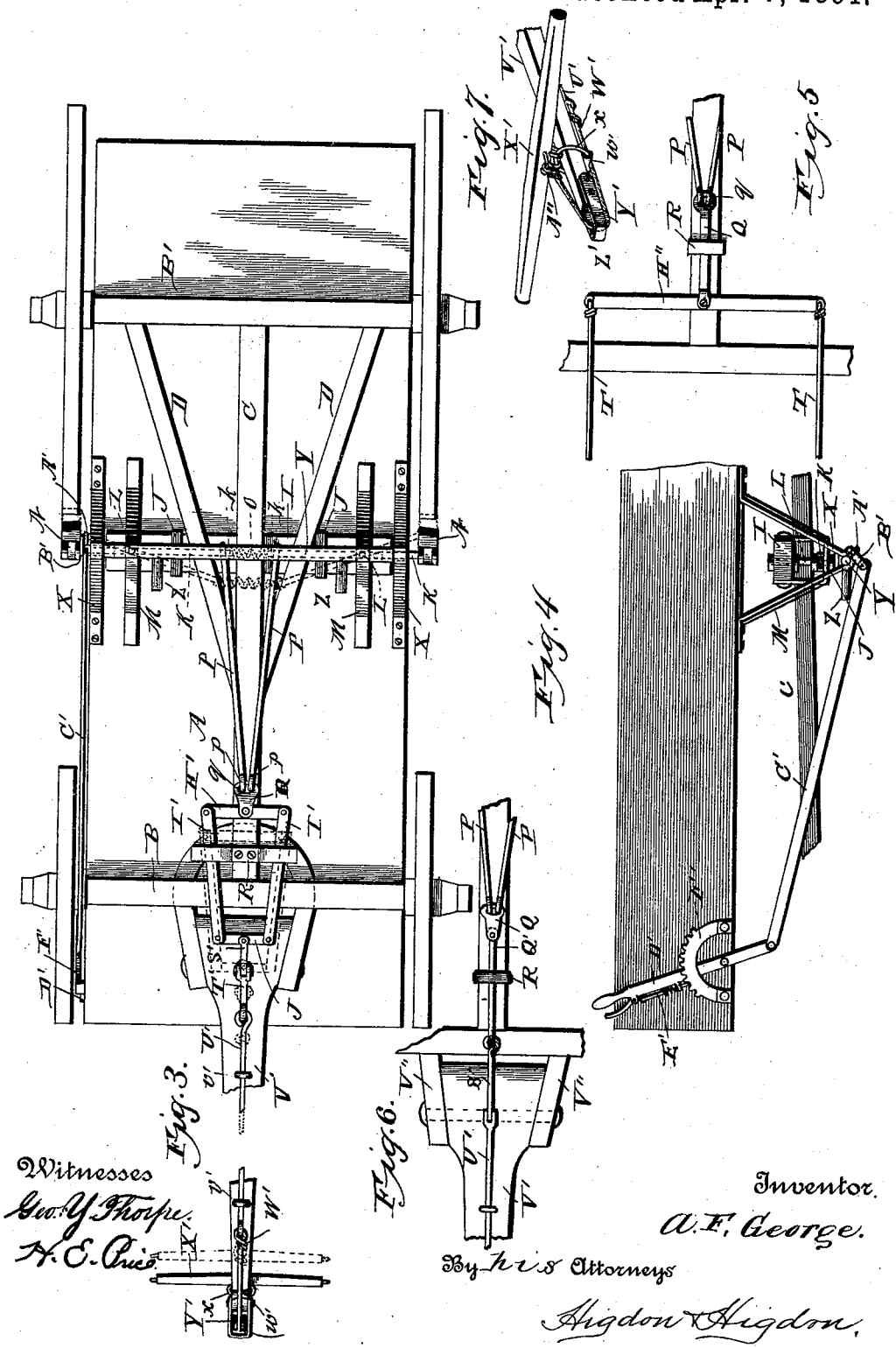

(No Model.) 3 Sheets—Sheet 3.
A. F. GEORGE.
AUTOMATIC BRAKE FOR VEHICLES.
No. 450,100. Patented Apr. 7, 1891.
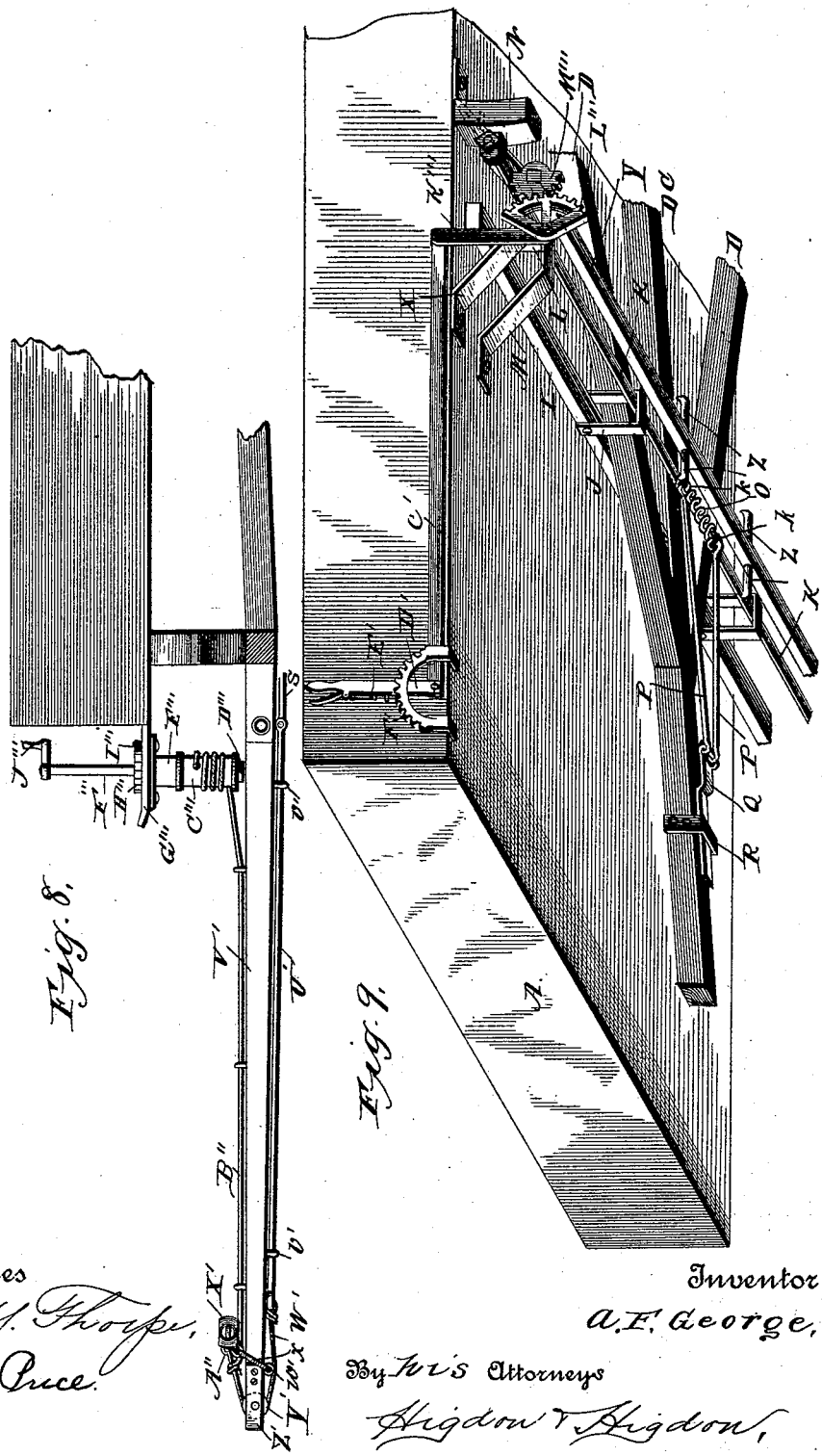

UNITED STATES PATENT OFFICE.

ALBERT F. GEORGE, OF KANSAS CITY, ASSIGNOR OF ONE-HALF TO J. W. GEORGE, G. W. EDENS, J. M. BLACK, W. W. HAELEY, AND B. L. EVANS, ALL OF CASSVILLE, MISSOURI.

AUTOMATIC BRAKE FOR VEHICLES.

SPECIFICATION forming part of Letters Patent No. 450,100, dated April 7, 1891.

Application filed August 8, 1890. Serial No. 361,448. (No model.)

*To all whom it may concern:*

Be it known that I, ALBERT F. GEORGE, of Kansas City, Jackson county, Missouri, have invented certain new and useful Improvements in Automatic Brakes for Vehicles, of which the following is a full, clear, and exact description, reference being had to the accompanying drawings, forming a part thereof.

My invention relates to improvements in automatic brakes for vehicles; and it consists in the novel combination and arrangement of the several parts, as will be hereinafter specified and claimed.

My object is to provide a brake for vehicles which when descending hills will automatically adjust itself against the periphery of the wheels with a force just in proportion to the pitch of the incline; and if this adjustment can be arranged to so adjust itself an important end will be attained, and to accomplish which I have invented the mechanism to be described. I also provide an attachment by which the brake may be employed when desiring to rest the horses during the ascent of the hill or if the horse is running away.

Referring to the drawings which illustrate this invention, Figure 1 is an inverted plan view of a one-horse vehicle provided with my invention. Fig. 2 is an inverted longitudinal section of the same on the line $x\ x$ of Fig. 1. Fig. 3 is an inverted plan view of a two-horse vehicle provided with my invention. Fig. 4 is a side elevation of the attachment for controlling the brake-levers. Fig. 5 is a modified form of attachment to be applied to one-horse vehicles. Fig. 6 is a modified form to be applied to two-horse vehicles. Fig. 7 is a detail perspective view of the forward end of the tongue of a wagon, showing the connection therewith of the forward part of my invention. Fig. 8 is a view of an attachment to be applied to a two-horse vehicle, preferably, by which the brake may be applied without backing the horses. Fig. 9 is a perspective view of a portion of the wagon-body provided with a modified form of attachment for controlling the brake mechanism.

A represents a wagon provided with the usual axles B B', draw-bar C, and hounds D D. Secured by thill-couplings to the forward axle are the shafts E E, provided with the cross-bar F, to which is pivoted the singletree G, to each end of which the traces H are secured in the usual manner.

Secured on the upper portion of the hounds and draw-bar, a little forward of the rear wheels, is the transverse bar I, from which depends the bracket J, in which rest near one end the horizontal brake-bars K, which are pivoted to the lower ends of the pins L, depending from the transverse bar I, the outer ends of said levers resting in the depending brackets M M and are provided with the usual brake-shoes N. The inner ends of these bars K are provided with the eyelets $k$, by means of which they are connected together by the coiled spring O. Connecting, also to their rear ends in the eyelets $k$ are the rods P P, the forward ends of which are provided with the eyelets or hooks $p$, secured loosely in a ring $q$ of a sliding bar Q, which is supported in place by the bracket R.

Pivoted in the forward end of the bar Q is the pulley S. A rope T passes around the pulley S, extending to either side around the pulleys U, secured under the forward axle or to the bed, thence forward around the pulleys V, secured to the under side of the shafts E of the vehicle, returning on their inward side and connecting with the rings $v$ of the breeching-strap W.

Depending from the bottom of the wagon at either edge thereof are the brackets X, in which is journaled at either end the transverse rod or bar Y in vertical alignment with and beneath the brake-levers K.

Extending forward horizontally from the transverse rod or bar Y are the projections or stops Z. The outer end of the bar Y is provided with the rearwardly-inclined projection or pin A', which is pivotally connected to the lower end of lever D', pivoted on the side of the wagon within reach of the driver by the connecting-rods D' C'.

The lever D' is provided with the lockingrod E', of ordinary construction, which operates in the segment-rack on the side of the wagon. By means of this lever D' and connections the pin or projection Z of the rod Y may be thrown upward to a position preventing the operation of the brake-rods K when desiring to back the wagon, as will be readily understood.

When using the invention in connection with a two-horse vehicle, the rods P P are connected at their forward ends to the bar Q, which is pivotally connected to the transverse bar H', the outer ends of which are pivotally connected with the bars I', which are pivotally connected at their forward ends with the transverse bar J'. The bracket R, secured to the draw-bar C, extending laterally, holds the bars I' in position.

Pivotally connected to the central point of the bars J' is the short rod S', which is vertically hinged in vertical alignment with and under the pivotal point of the tongue of the wagon to the rear of the rod T', which is connected to the rear end of the rod U', supported to the under side of the tongue V' by the loops $v'$.

Secured to the forward ends of the rods V' is the rope W', which passes under the spool $w'$ of the ring $x$, which is secured to the under side of the neck-yoke X' at the forward end of the tongue in the usual manner, and around a pulley Y', journaled in the bracket Z', secured to the forward end of the tongue, and is then fastened to A'' to the forward side of the neck-yoke X'.

In the modified form of the single-horse attachment in Fig. 5 I show instead of the pulley S at the forward end of the sliding rod Q, pivotally secured at its center and extending to either side, the pivoted rod or singletree H'', at either end of which the rear ends of the ropes T are secured, passing forward around the pulleys V and connecting with the breeching-strap W, as described.

In Fig. 6, instead of the pivotal bracket consisting of the horizontal and transverse bars I I' and H' J', I show the rod Q', hinged below the forward axle B to the rod S', which is vertically hinged to the rear end of the rod U' underneath and in vertical alignment with the pivotal point of the tongue V'.

In Fig. 8 I show my attachment, preferably for use on a two-horse vehicle, consisting of the cord or rope B'', which is secured to the cord W above the tongue and in rear of the pulley Y'. The rope B'', held in place by loops secured on the upper surface of the tongue B', extends rearward and is secured to the drum C''', which is held in place between the nut D''' and bracket E''', secured, preferably, to the under side of the foot-board G''' of the vehicle. The rod F''' passes through the sleeve or bracket E''' loosely, has the drum rigidly secured thereon, and is engaged at its lower end by the nut D'''. The upper end of the rod has secured thereon the crank-handle J''' for operating the same. The ratchet H''', provided with the ordinary pawl I''' for engaging the teeth of the same, surrounds the vertical rod F''' and rests on the upper surface of the foot-board G'''.

In Fig. 9 I show an attachment having the rod Y, provided with the forwardly and rearwardly extending stops or projections Z Z, the said rod being supported in the manner described, provided at its end with the rack-segment M''', engaging the teeth of the rack-segment L''', secured to the lower end of the vertical bar K''', which is connected to the lower end of the lever D' by means of the rod C', and by which mechanism, by throwing the lever D' either rearward or forward, the brake may be prevented from being applied to allow the braking of the wagon, or when the brake is applied to prevent the releasing of the same, as will be readily understood.

Having thus fully described my invention, what I claim as new, and desire protection in by Letters Patent, is—

1. In an automatic brake for vehicles, the combination of the brake mechanism described with the transverse bar Y, journaled near either end in the brackets X, depending from the bottom of the wagon, provided with the forwardly-extending horizontal pins Z and at one end with the pin A', which is connected to a hand-lever D', provided with the locking-rod E' by means of the connecting-rods B' and C', the lever D', carrying the locking-lever E', operates in the rack-segment F', secured to the side of the wagon, by which the pins or projections Z of the rod Y may be locked against the brake-levers K when the lever D is operated, substantially as described.

2. In an automatic brake for vehicles, the pivoted levers K, provided with brake-shoes on the outer ends and connected at their inner ends by the spring O to compel said levers when the brake is released to resume their normal position, the forwardly-extending rods P P, connected with the rear end of the sliding bar Q, supported in the bracket R and carrying the horizontal pulley S on its forward end, and the continuous rope T, passing around the pulleys V on the under side of the front axle, the pulleys on the under side of the shafts, and thence returning inwardly and connected with the rings $v$ of the breeching-strap W, substantially as described.

3. In a vehicle-brake, the combination, with two pivoted brake-bars, one upon each side of the vehicle, of a retractile spring having its opposite ends connected to the inner ends of the said brake-bars, rods P, having their rear ends connected with the said inner ends of the said bars, a sliding bar connected with the forward ends of both of the said rods, means for drawing the said sliding bar forward, and a pivoted bar below the said brake-bars having stops upon its sides, as described.

4. In a vehicle-brake, the combination, with two pivoted brake-bars, one upon each side of the vehicle, of a retractile spring having its opposite ends connected with the inner ends of the said brake-bars, rods P, having their rear ends connected with the inner ends of the said brake-bars, a sliding bar connected with the forward ends of both of the said rods, a pulley upon the forward end of the said sliding bar, pulleys upon the shafts of the vehicle, and a rope having its central portion passing around the pulley upon the said sliding bar and having its ends passing around the said pulleys upon the shafts and brought back toward the rear, as described.

In testimony whereof I affix my signature in presence of two witnesses.

ALBERT F. GEORGE.

Witnesses:
   GEO. Y. THORPE,
   H. E. PRICE.